(12) United States Patent
Kariya et al.

(10) Patent No.: US 10,946,570 B2
(45) Date of Patent: Mar. 16, 2021

(54) INJECTION MOLDING METHOD AND INJECTION MOLDING MACHINE

(71) Applicant: Mitsubishi Heavy Industries Plastic Technology Co., Ltd., Nagoya (JP)

(72) Inventors: Toshihiko Kariya, Nagoya (JP); Yasuo Okochi, Nagoya (JP)

(73) Assignee: MITSUBISHI HEAVY INDUSTRIES PLASTIC TECHNOLOGY CO., LTD., Nagoya (JP)

( * ) Notice: Subject to any disclaimer, the term of this patent is extended or adjusted under 35 U.S.C. 154(b) by 212 days.

(21) Appl. No.: 15/307,699

(22) PCT Filed: Jun. 6, 2014

(86) PCT No.: PCT/JP2014/065079
§ 371 (c)(1),
(2) Date: Oct. 28, 2016

(87) PCT Pub. No.: WO2015/186246
PCT Pub. Date: Dec. 10, 2015

(65) Prior Publication Data
US 2017/0050357 A1 Feb. 23, 2017

(51) Int. Cl.
*B29C 45/16* (2006.01)
*B29C 45/70* (2006.01)
(Continued)

(52) U.S. Cl.
CPC .......... *B29C 45/16* (2013.01); *B29C 45/1635* (2013.01); *B29C 45/64* (2013.01);
(Continued)

(58) Field of Classification Search
CPC ..... B29C 45/16; B29C 45/1635; B29C 45/64; B29C 45/70; B29C 45/7653;
(Continued)

(56) References Cited

U.S. PATENT DOCUMENTS 4,131,596 A * 12/1978 Allen .................. B29C 45/7653
264/40.5
2012/0119403 A1 * 5/2012 Kariya ................ B29C 45/1628
264/46.8

FOREIGN PATENT DOCUMENTS

CN 1826214 A 8/2006
CN 102320113 A 1/2012
(Continued)

OTHER PUBLICATIONS

International Search Report dated Jul. 15, 2014, issued in counterpart International Application No. PCT/JP2014/065079, with English translation. (4 pages).
(Continued)

*Primary Examiner* — Robert S Walters, Jr.
(74) *Attorney, Agent, or Firm* — Westerman, Hattori, Daniels & Adrian, LLP (57) ABSTRACT

This injection molding method uses an injection molding machine for two-material molding, which comprises a first mold part that is provided with a cavity and a second mold part that is provided with a cavity and is arranged in tandem with the first mold part. This injection molding method comprises: a first molding step wherein a material is injected into the cavity of the first mold part and the material in the cavity is compressed; and a second molding step wherein a material is injected into the cavity of the second mold part. A pressure, which is generated in the second mold part by injecting the material into the cavity in the second molding step, acts on the first mold part, and a compressive force is applied to the material in the cavity in the first molding step.

4 Claims, 9 Drawing Sheets

(51) Int. Cl.
  *B29C 45/64* (2006.01)
  *B29C 45/76* (2006.01)
  *B29C 45/26* (2006.01)
(52) U.S. Cl.
  CPC .......... *B29C 45/70* (2013.01); *B29C 45/7653* (2013.01); *B29C 2045/2683* (2013.01); *B29C 2945/76498* (2013.01); *B29C 2945/76709* (2013.01); *B29C 2945/76869* (2013.01)
(58) Field of Classification Search
  CPC .. B29C 2045/2683; B29C 2945/76498; B29C 2945/76709; B29C 2945/76869
  See application file for complete search history.

(56) References Cited

FOREIGN PATENT DOCUMENTS

| | | |
|---|---|---|
| JP | 7-195413 A | 8/1995 |
| JP | 2005-205819 A | 8/2005 |
| JP | 2007-50585 A | 3/2007 |
| JP | 2010-5792 A | 1/2010 |
| JP | 4781324 B2 | 9/2011 |
| WO | 2009/118833 A1 | 10/2009 |

OTHER PUBLICATIONS

Written Opinion dated Jul. 15, 2014, issued in counterpart International Application No. PCT/JP2014/065079, with English translation. (9 pages).

Office Action dated Dec. 18, 2017, issued in counterpart Chinese Application No. 201480078375.8, with English translation (11 pages).

Notice of Allowance dated Nov. 7, 2017, issued in counterpart Japanese Application No. 2016-525650, with English translation (6 pages).

* cited by examiner

INJECTION MOLDING METHOD AND INJECTION MOLDING MACHINE

TECHNICAL FIELD

For example, the present invention relates to an injection molding method and an injection molding machine capable of performing two-material molding which molds two materials together or the like.

BACKGROUND ART

Figure 10:
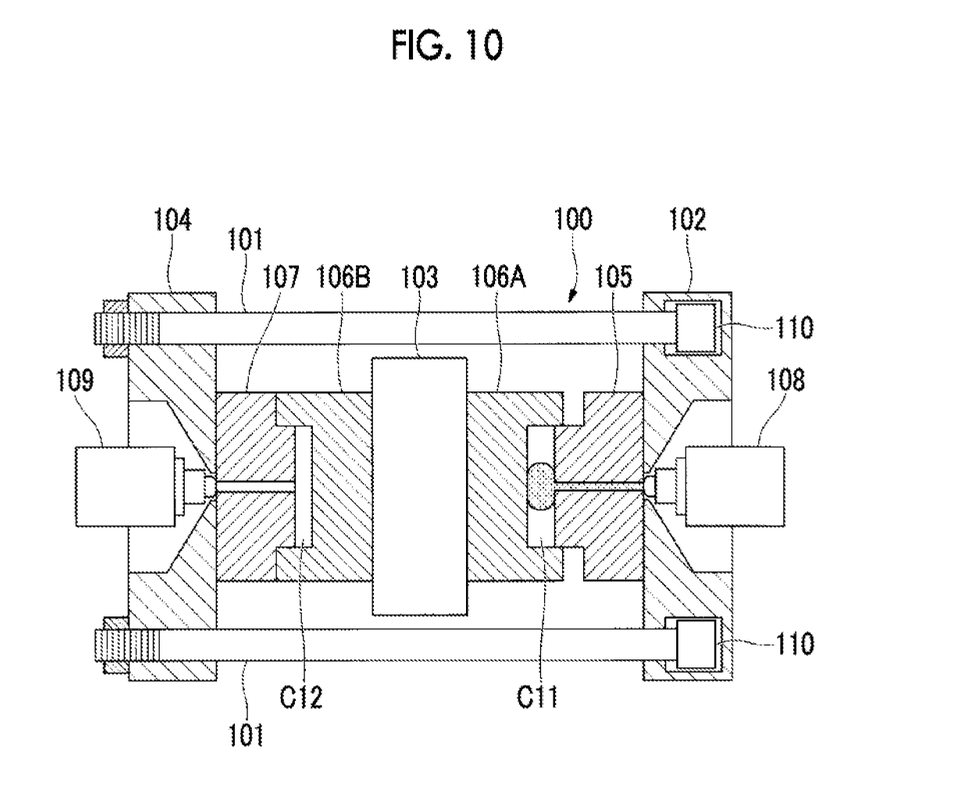
FIG. 10 is a horizontal sectional view showing a schematic configuration of an injection molding machine in the related art.

In the related art, as an injection molding machine for two-material molding which molds two materials together, a configuration described in the following PTL 1 is known. In this kind of the injection molding machine for two-material molding, as shown in FIG. 10, a configuration which includes a fixed platen 102, a movable platen 104, and a reverse platen 103 is known.

A fixed mold 105 is provided on one side surface of the fixed platen 102.

The movable platen 104 is movable in directions in which the movable platen 104 approaches and is separated from the fixed platen 102. The movable platen 104 includes a movable mold 107 on a side facing the fixed platen 102.

The reverse platen 103 is provided between the fixed platen 102 and the movable platen 104. The reverse platen 103 includes reverse molds 106A and 106B on both side surfaces thereof. The reverse platen 103 is 180° reversible, and the reverse molds 106A and 106B can alternately face the fixed mold 105 provided on the fixed platen 102 and the movable mold 107 provided on the movable platen 104.

In the injection molding machine for two-material molding 100, a cavity C11 is formed between the fixed mold 105 provided on the fixed platen 102, and the reverse mold 106A provided on one side surface of the fixed platen 102. Moreover, a cavity C12 is formed between the movable mold 107 provided on the movable platen 104 and the reverse mold 106B provided on the other side surface of the fixed platen 102. A resin is injected from injection units 108 and 109 to fill each of two cavities C11 and C12.

An example of a method which performs two-material molding using the injection molding machine for two-material molding 100 will be described. First, the fixed mold 105 and one reverse mold 106A are closed. In addition, a resin is injected from the injection unit 108 to fill the cavity C11 between the fixed mold 105 and the reverse mold 106A so as to perform primary molding, and a primary molded body is formed. Subsequently, after the fixed mold 105 and the reverse mold 106A are opened, the reverse platen 103 is reversed, and the primary molded body faces the movable mold 107 along with the reverse mold 106A facing the fixed mold 105. In addition, a resin is injected from the injection unit 109 to fill the cavity C12 formed between the reverse mold 106A and the movable mold 107 in a state where the primary molded body is accommodated so as to perform secondary molding. Accordingly, a secondary molded body configured of two materials is formed in the cavity C12 between the reverse mold 106A and the movable mold 107. In addition, the reverse mold 106A and the movable mold 107 are opened to extract the secondary molded body.

A method is known in which, when the two-material molding is performed according to the above-described flow, after resins are injected to fill the cavities C11 and C12, the fixed platen 102, the reverse platen 103, and the movable platen 104 are clamped to each other by tie bars 101 of mold-clamping cylinders 110 which are provided on four corners of the fixed platen 102, the reverse platen 103, and the movable platen 104. In this case, the fixed platen 102, the reverse platen 103, and the movable platen 104 are simultaneously clamped, that is, are clamped together so as to decrease the capacity of the cavity C11 or the cavity C12, the resins which fill the inner portions of the cavities C11 and C12 are compressively molded, and it is possible to obtain a molded article having high accuracy.

CITATION LIST

Patent Literature

[PTL 1] Japanese Unexamined Patent Application Publication No. 2007-50585

SUMMARY OF INVENTION

Technical Problem

Figure 11:
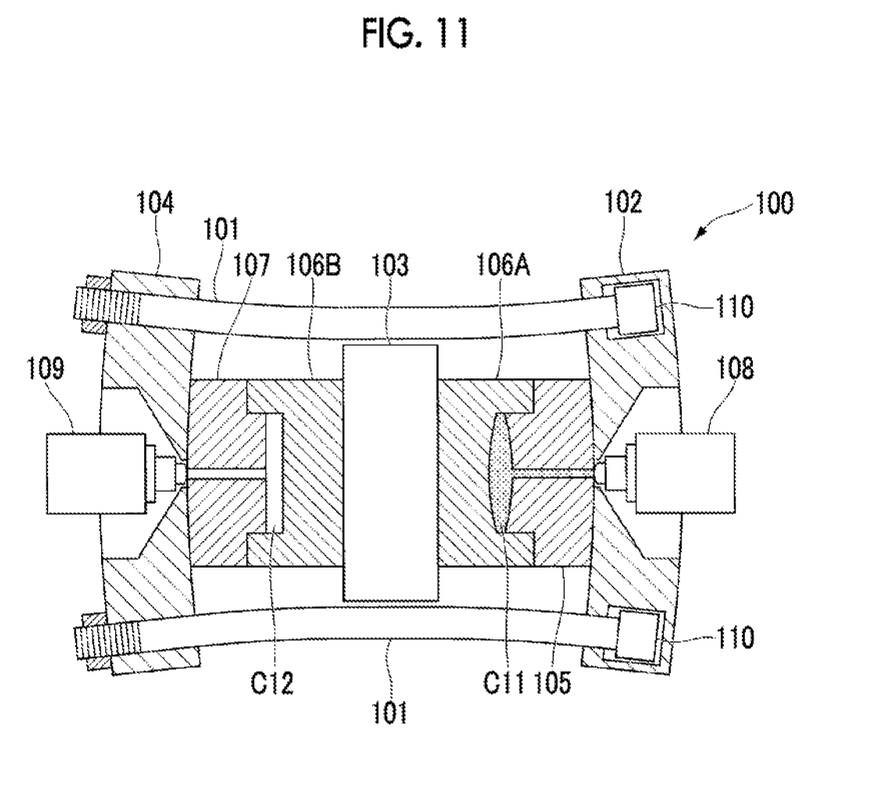
FIG. 11 is a horizontal sectional view showing a state where a material which fills a cavity is compressed in the injection molding machine of the related art.

However, as shown in FIG. 11, in the above-described injection molding machine for two-material molding 100, if the fixed platen 102, the reverse platen 103, and the movable platen 104 are clamped by the tie bars 101 positioned at the four corners, the fixed platen 102 and the movable platen 104 are strongly clamped to each other on outer peripheral sides of the fixed mold 105, the reverse molds 106A and 106B, and the movable mold 107. Accordingly, the fixed platen 102 and the movable platen 104 are bent such that a center portion of a mold attachment surface is recessed with the four corners at which the tie bars 101 are positioned as starting points.

As a result, among parting surfaces of the cavities C11 and C12 formed between the fixed mold 105 and the reverse mold 106A, and the reverse mold 106B and the movable mold 107, portions (hereinafter, referred to as corner portions) positioned at four corners corresponding to the tie bars 101 strongly come into close contact with each other. Accordingly, the resin spreads out to the cavities C11 and C12, and there are no relief passes for extruded gas on the corner portions of the outer peripheries of the cavities C11 and C12. As a result, in the obtained secondary molded body, molding failures where the resin does not spread out to the corners of the cavities due to burning of gas or masses of gas, or the like occur.

Meanwhile, in portions except for the corner portions among the parting surfaces, that is, in intermediate portions positioned between corner portions adjacent to each other in directions along the peripheries of the cavities C11 and C12 among the parting surfaces, the mold clamping force is weakened. Accordingly, a seal contact pressure between the parting surfaces decreases, and a gap easily occurs between the parting surfaces. If a resin flows into the gap, burrs occur in the obtained secondary molded body.

As described above, since variation (differences in contact pressure between the corner portions and the intermediate portions) of the mold clamping force occurs in the parting surfaces, or the like, compression deformation is small at the intermediate portions positioned between the corner portions while compression deformation is large at the corner portions of the cavities. As a result, in the obtained secondary molded body, the center portions of the cavities become swollen relative to the corner portions, and thicknesses becomes not uniform. In a case where the obtained secondary molded body has light transmittance, optical distortion may occur.

Moreover, in the injection molding machine for two-material molding 100, in order to secure the seal contact pressure in the intermediate portion of the cavity surface, even when the mold clamping force is increased by the tie bars 101 (mold-clamping cylinders 110), it is not possible to solve the problem due to variation of the mold clamping forces on the parting surface. In addition, in a case where the obtained secondary molded body has light transmittance, the resins positioned at the corner portions of the cavities are greatly compressed, densities of the resins become excessive, and great optical distortion due to high refraction of light occurs.

Here, in order to decrease influences due to the above-described bending of the fixed platen 102 and the movable platen 104, for example, adoption of a configuration in which a mold attachment platen having a protrusion portion at the center portion is provided between the fixed platen 102 and the movable platen 104 may be considered.

However, in this case, the size of the injection molding machine 100 further increases in the direction in which the fixed platen 102, the movable platen 104, and the reverse platen 103 are arranged, and there is a problem that an installation space increases or the like.

An object of the present invention is to provide an injection molding method and an injection molding machine capable of performing molding with excellent quality while preventing an increase in size, an increase in weight, and an increase in a cost of an apparatus.

Solution to Problem

According to a first aspect of the present invention, there is provided an injection molding method which uses an injection molding machine including a first mold part which is provided with a first cavity, and a second mold part which is provided with a second cavity and is arranged in tandem with the first mold part, the injection molding method including: a first molding step of injecting a material into the first cavity and compressing the material in the first cavity; and a second molding step of injecting a material into the second cavity, in which a pressure, which is generated in the second mold part by injecting the material into the second cavity in the second molding step, acts on the first mold part, and a compressive force is applied to the material in the first cavity in the first molding step.

According to a second aspect of the present invention, in the injection molding method of the first aspect, in the second molding step, after the second mold part is opened by a pressure of the material injected into the second cavity, the second mold part may be closed and a compressive force may be applied to the material in the second cavity.

According to a third aspect of the present invention, in the injection molding method of the first or second aspect, in the first molding step and the second molding step, the first mold part and the second mold part may be clamped together by mold clamping means, and when the pressure, which is generated in the second mold part by injecting the material into the second cavity in the second molding step, acts on the first mold part, a mold clamping force in the first mold part and the second mold part may decrease.

According to a fourth aspect of the present invention, in the injection molding method of any one of the first to third aspects, in order to laminate a second material on a primary molded body formed of a first material to form a secondary molded body formed of the first material and the second material, in the first molding step, the second material may be injected in a state where the primary molded body is accommodated in the first cavity to form the secondary molded body, and in the second molding step, the first material may be injected into the second cavity to form the primary molded body.

According to a fifth aspect of the present invention, there is provided an injection molding machine, including: a first mold part which is provided with a first cavity; a second mold part which is provided with a second cavity and is arranged in tandem with the first mold part; and a controller which injects a material into the first cavity, compresses the material in the first cavity, and injects a material into the second cavity, in which the controller causes a pressure, which is generated in the second mold part by injecting the material into the second cavity of the second mold part, to act on the first mold part, and applies a compressive force to the material in the first cavity.

According to a sixth aspect of the present invention, the injection molding machine of the fifth aspect may further include: a fixed platen; a movable platen which is provided to be movable in directions in which the movable platen approaches and is separated from the fixed platen; and a reverse platen which is provided between the fixed platen and the movable platen, and is provided so as to be reversible between a side facing the fixed platen and a side facing the movable platen, in which one of the first mold part and the second mold part may be provided between the fixed platen and the reverse platen, and the other of the first mold part and the second mold part may be provided between the reverse platen and the movable platen.

Advantageous Effects of Invention

According to the above-described injection molding method and injection molding machine, it is possible to perform molding with excellent quality while preventing an increase in size, an increase in weight, and an increase in a cost of an apparatus.

DESCRIPTION OF EMBODIMENTS

First Embodiment

Figure 1:
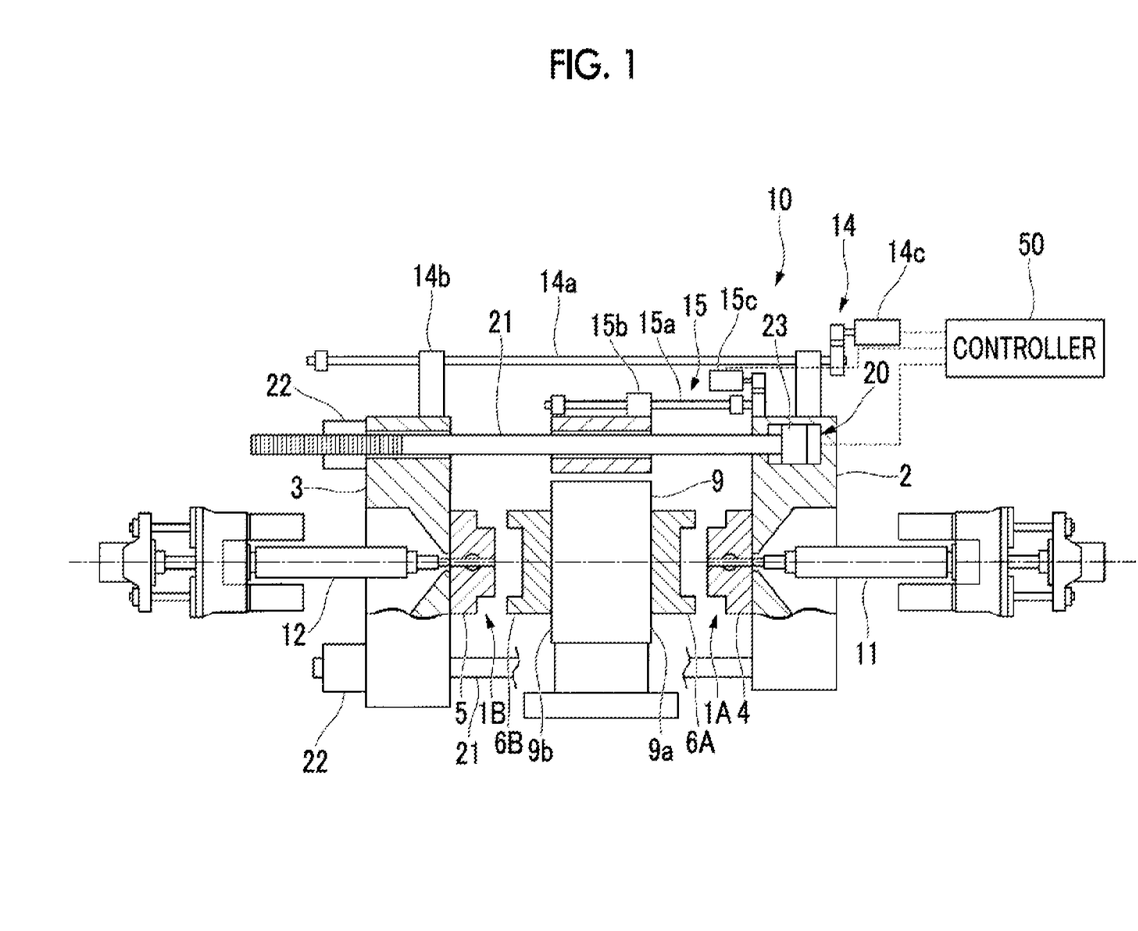
FIG. 1 is a vertical sectional view showing a schematic configuration of an injection molding machine in a first embodiment of the present invention.

A first embodiment of the present invention will be described with reference to the drawings. FIG. 1 is a vertical sectional view showing a schematic configuration of an injection molding machine in a first embodiment of the present invention.

In an injection molding machine for two-material molding described in this embodiment, resins different from each other are injected into each of two cavities which are formed by a mold of a movable platen, a mold of a fixed platen, and molds on both surfaces of the reverse platen which is installed between both platens, and two-layer molding is performed by rotating the reverse platen by 180° to mold the resins together.

As shown in FIG. 1, an injection molding machine for two-material molding 10 includes a fixed platen 2, a movable platen 3, a reverse platen 9, injection units 11 and 12, and a controller 50 on a base (not shown).

The fixed platen 2 includes a fixed mold 4 on one side surface.

The movable platen 3 is disposed to be parallel with the fixed platen 2. The movable platen 3 is provided to be movable in directions in which the movable platen 3 approaches and is separated from the fixed platen 2. The movable platen 3 includes a movable mold 5 on a side surface facing the fixed platen 2.

The reverse platen 9 is provided to be parallel with the fixed platen 2 and the movable platen 3 between the fixed platen 2 and the movable platen 3. The reverse platen 9 is provided rotatable in normal and reverse directions by 180° around a vertical axis. In the reverse platen 9, reverse molds 6A and 6B are provided on two side surfaces 9a and 9b which are parallel to each other. The reverse platen 9 rotates around the vertical axis (rotary axis), and thus, the reverse molds 6A and 6B alternately face the fixed mold 4 and the movable mold 5.

Figure 2:
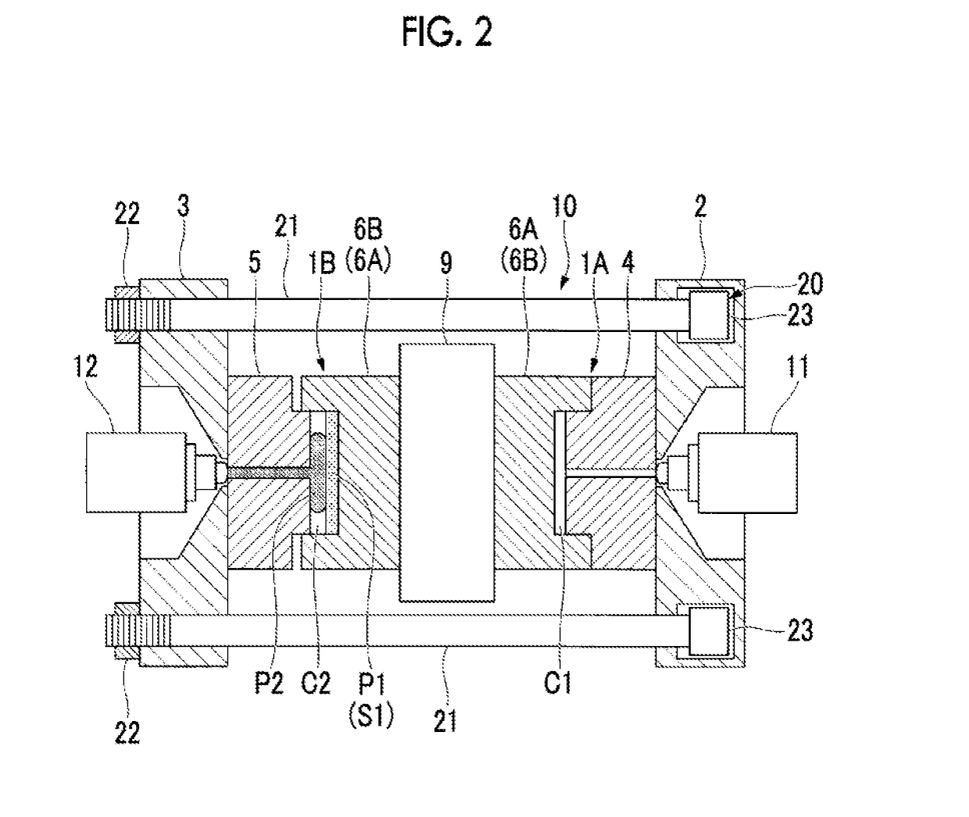
FIG. 2 is a view showing a flow of an injection molding method in the injection molding machine in the first embodiment of the present invention, and a horizontal sectional view showing a state where a material is injected into a first cavity in a first molding step.

As shown in FIG. 2, the reverse molds 6A and 6B which are provided on both side surfaces 9a and 9b of the reverse platen 9 are closed in a state of facing the fixed mold 4 and the movable mold 5, and thus, a cavity C1 and a cavity C2 are formed. The reverse molds 6A and 6B have the same shape as each other, and are provided to be point-symmetrical based on the rotary axis of the reverse platen 9.

The fixed mold 4 and the reverse mold 6A or 6B face each other between the fixed platen 2 and the reverse platen 9, and thus, a fixed platen side mold part 1A having the cavity C1 is formed, in addition, the movable mold 5 and the reverse mold 6A or 6B face each other between the movable platen 3 and the reverse platen 9, and thus, a movable platen side mold part 1B having the cavity C2 is formed.

Accordingly, the injection molding machine for two-material molding 10 includes the fixed platen side mold part 1A which is provided with the cavity C1, and the movable platen side mold part 1B which is provided with the cavity C2 and is arranged in tandem with the fixed platen side mold part 1A. One of the fixed platen side mold part 1A and the movable platen side mold part 1B perform primary molding, and the other performs secondary molding.

The injection unit 11 is installed on the fixed platen 2 side. The injection unit 11 injects a resin into the cavity C1 which is formed between the fixed mold 4 and the reverse mold 6A or 6B.

The injection unit 12 is installed on the movable platen 3 side. The injection unit 12 injects a resin into the cavity C2 which is formed between the movable mold 5 and the reverse mold 6A or 6B. The injection unit 12 is connected to the movable platen 3, and moves along with approaching and separation operations (opening and closing operations) of the movable platen 3 with respect to the fixed platen 2.

As shown in FIG. 1, movable platen opening and closing means 14 is provided on each of both sides in a width direction of the injection molding machine for two-material molding 10, that is, in a direction orthogonal to a direction in which the fixed platen 2 and the movable platen 3 are arranged. The movable platen opening and closing means 14 includes a ball screw shaft 14a, a ball screw nut 14b, and a servo motor 14c.

The ball screw shaft 14a is supported by the fixed platen 2. An axial movement of one end of the ball screw shaft 14a is restricted by the fixed platen 2, and the one end is rotatable around the center axis of the ball screw shaft 14a. The other end of the ball screw shaft 14a is screwed to the ball screw nut 14b. The ball screw nut 14b is provided so as to be fixed to the movable platen 3. The servo motor 14c is connected to one end of the ball screw shaft 14a, and rotationally drives the ball screw shaft 14a around the center axis.

The movable platen opening and closing means 14 drives the servo motor 14c, and thus, rotationally drives the ball screw shaft 14a around the center axis. Accordingly, the ball screw nut 14b, which is screwed to the ball screw shaft 14a and is provided to be fixed to the movable platen 3, moves along the ball screw shaft 14a.

The servo motors 14c and 14c which are provided on both sides in the width direction of the injection molding machine for two-material molding 10 are synchronously operated. Accordingly, the movable platen 3 approaches and is separated from the fixed platen 2 and the reverse platen 9 in a state where the movable platen 3 is parallel with the fixed platen 2 and the reverse platen 9 is maintained, and performs opening and closing operations.

Reverse platen opening and closing means 15 is provided on each of both sides in the width direction of the injection molding machine for two-material molding 10. The reverse platen opening and closing means 15 includes a ball screw shaft 15a, a ball screw nut 15b, and a servo motor 15c.

The ball screw shaft 15a is supported by the fixed platen 2. An axial movement of one end of the ball screw shaft 15a is restricted by the fixed platen 2, and the one end is rotatable around the center axis of the ball screw shaft 15a. The other end of the ball screw shaft 15a is screwed to the ball screw nut 15*b*. The ball screw nut 15*b* is provided so as to be fixed to the reverse platen 9. The servo motor 15*c* is connected to one end of the ball screw shaft 15*a*, and rotationally drives the ball screw shaft 15*a* around the center axis. In addition, the ball screw shaft 15*a* may not be supported by the fixed platen 2, or, for example, and the ball screw shaft 15*a* may be rotatable around the center axis thereof while the axial movement of one end of the ball screw shaft 15*a* being restricted by the movable platen 3.

The reverse platen opening and closing means 15 drives the servo motor 15*c*, and thus, rotationally drives the ball screw shaft 15*a* around the center axis. Accordingly, the ball screw nut 15*b*, which is screwed to the ball screw shaft 15*a* and is provided to be fixed to the reverse platen 9, moves along the ball screw shaft 15*a*.

The servo motors 15*c* and 15*c* which are provided on both sides in the width direction of the injection molding machine for two-material molding 10 are synchronously operated. Accordingly, the reverse platen 9 approaches and is separated from the fixed platen 2 and the movable platen 3 in a state where the reverse platen 9 is parallel with the fixed platen 2 and the movable platen 3 is maintained, and performs opening and closing operations.

The injection molding machine for two-material molding 10 includes mold clamping means 20 for clamping the fixed platen 2, the movable platen 3, and the reverse platen 9 described above. The mold clamping means 20 includes tie bars 21, tie bar fixing means 22, and hydraulic cylinders 23 (mold-clamping cylinders).

The tie bars 21 are disposed at four corners of the fixed platen 2, the movable platen 3, and the reverse platen 9. One end of each of the tie bars 21 is connected to the hydraulic cylinder 23, and the other end penetrates the reverse platen 9 and the movable platen 3 and protrudes from the movable platen 3.

The tie bar fixing means 22 is mounted on a portion through which the tie bar 21 protrudes from the movable platen 3.

Each of the hydraulic cylinders 23 includes a ram which is built in the fixed platen 2. One end of the tie bar 21 is connected to the ram. Four hydraulic cylinders 23 which are provided at four corners of the fixed platen 2, the movable platen 3, and the reverse platen 9 are synchronously operated by a controller 50, and clamp the fixed platen 2, the movable platen 3, and the reverse platen 9 together.

Next, an injection molding method in the above-described injection molding machine for two-material molding 10 will be described. Moreover, the injection molding method described below in the injection molding machine for two-material molding 10 is realized by performing processing based on a computer program which is preset by the controller 50. For example, the controller 50 controls the movable platen 3, the reverse platen 9, the injection units 11 and 12, the mold clamping means 20, or the like.

Figure 3:
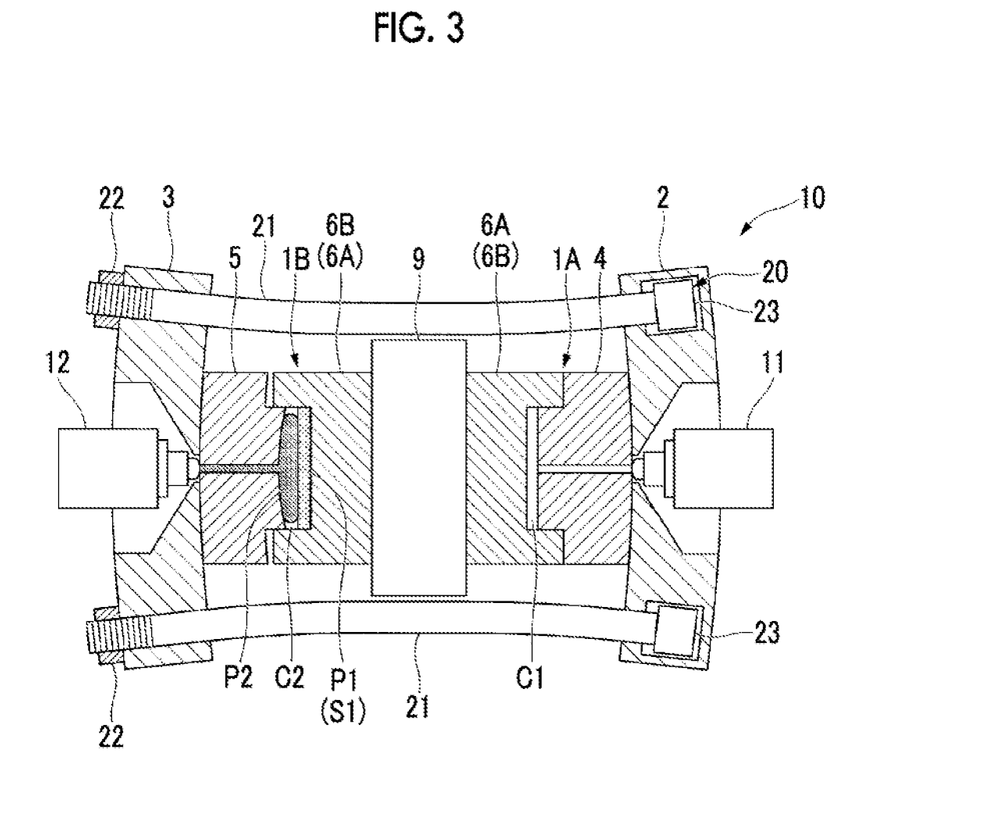
FIG. 3 is a view showing the flow of the injection molding method in the injection molding machine in the first embodiment of the present invention, and a horizontal sectional view showing a state where the material which fills the first cavity in the first molding step is compressed.
Figure 4:
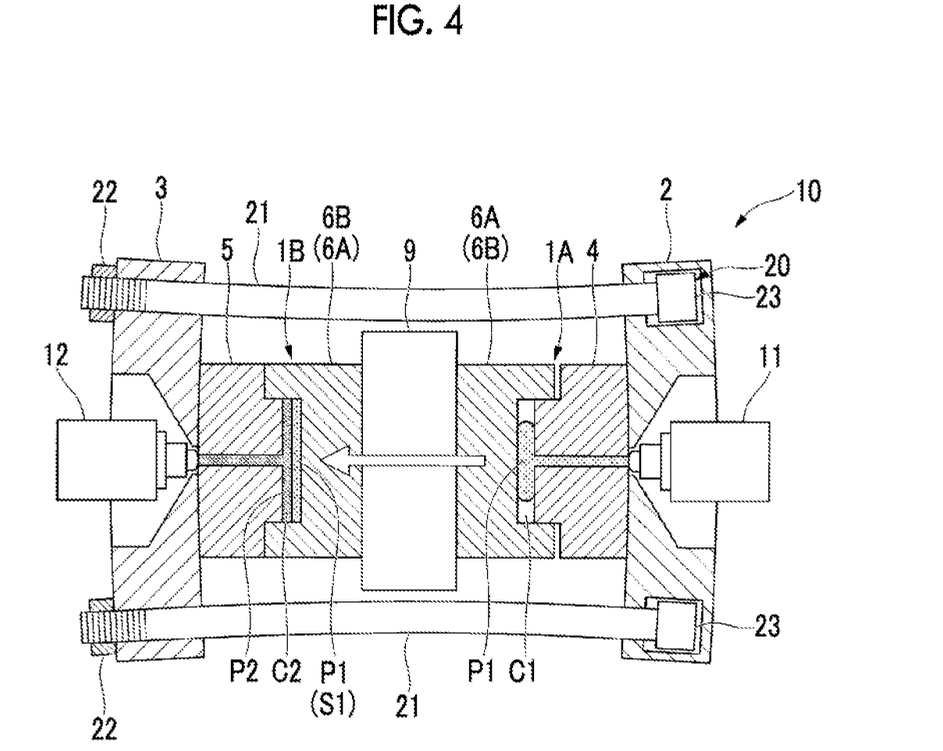
FIG. 4 is a view showing the flow of the injection molding method in the injection molding machine in the first embodiment of the present invention, and a horizontal sectional view showing a state where a material fills a second cavity in a second molding step.
Figure 5:
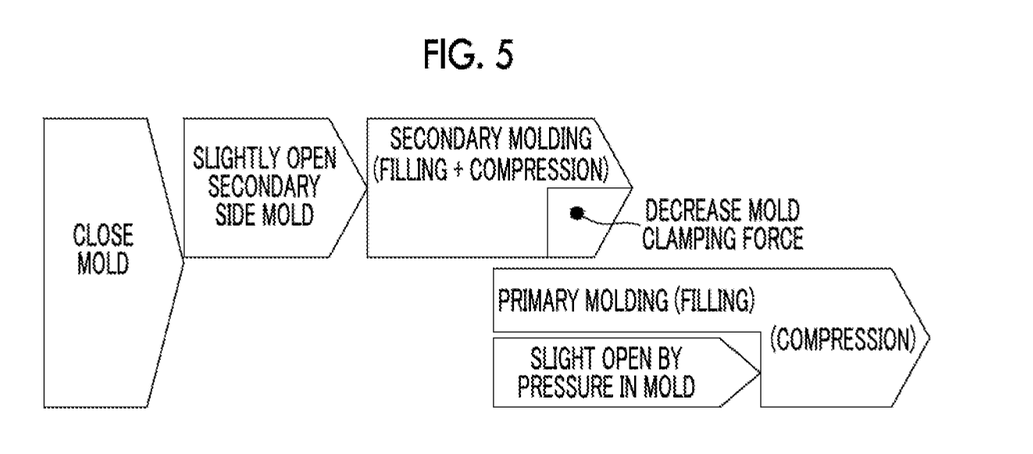
FIG. 5 is a diagram showing the flow of the injection molding method in the first embodiment of the present invention.

FIG. 2 is a view showing the flow of the injection molding method in the injection molding machine in the first embodiment of the present invention, and a horizontal sectional view showing a state where a material is injected into a first cavity in a first molding step. FIG. 3 is a view showing the flow of the injection molding method in the injection molding machine in the first embodiment of the present invention, and a horizontal sectional view showing a state where the material which fills the first cavity in the first molding step is compressed. FIG. 4 is a view showing the flow of the injection molding method in the injection molding machine in the first embodiment of the present invention, and a horizontal sectional view showing a state where a material fills a second cavity in a second molding step. FIG. 5 is a diagram showing the flow of the injection molding method in the first embodiment of the present invention.

As shown in FIG. 5, in the injection molding machine for two-material molding 10, after the movable platen 3 and the reverse platen 9 move to close the fixed platen side mold part 1A and the movable platen side mold part 1B, the secondary molding and primary molding are sequentially performed. A portion of the secondary molding and the primary molding may be performed in parallel with each other. In the present embodiment, as shown in FIG. 2, the movable platen side mold part 1B performs the secondary molding, and as shown in FIG. 4, the fixed platen side mold part 1A performs the primary molding. The secondary molding and the primary molding are compression molding including compression of material.

(Secondary Molding)

In the secondary molding, after the fixed platen side mold part 1A and the movable platen side mold part 1B are closed, as shown in FIG. 2, the movable platen 3 moves to slightly open the movable platen side mold part 1B against the fixed platen side mold part 1A. In addition, a primary molded body S1 which has been formed at the immediately preceding cycle is inserted into the cavity C2 of the movable platen side mold part 1B.

Moreover, a second molten resin (second material) P2 is injected from the injection unit 12 to fill the cavity C2 which is formed between the reverse mold 6A and the movable mold 5. In this case, since the primary molded body S1 is held in the reverse mold 6B, the second molten resin P2 fills the cavity C2 so as to laminate the primary molded body S1 formed of the first molten resin P1. In addition, as shown in FIG. 3, the movable platen side mold part 1B is clamped by the mold clamping means 20, the second molten resin P2 inside the cavity C2 is compressed.

(Primary Molding)

In the primary molding, the cavity C1 which is formed between the reverse mold 6A and the fixed mold 4 is slightly open, and the first molten resin P1 is injected from the injection unit 11 to fill the cavity C1. Moreover, the movable platen side mold part 1B is clamped by the mold clamping means 20 to compress the first molten resin P1 inside the cavity C1.

As describe above, in both the secondary molding and the primary mold, the molten resins P1 and P2 are compressed by the mold clamping means 20. In this case, the mold clamping means 20 clamps the fixed platen 2, the movable platen 3, and the reverse platen 9 together, and closes the fixed platen side mold part 1A and the movable platen side mold part 1B. After the second molten resin P2 inside the cavity C2 and the first molten resin P1 inside the cavity C1 are cooled and solidified until the resins can be separated from the molds, the mold clamping means 20 decreases the mold clamping force generated by the mold clamping means 20. Thereafter, the movable platen opening and closing means 14 and the reverse platen opening and closing means 15 open the fixed platen side mold part 1A and the movable platen side mold part 1B. In this case, the second molten resin P2 is solidified, and thus, the secondary molded body configured of the first molten resin P1 and the second molten resin P2 is formed in the cavity C2. In addition, the first molten resin P1 is solidified, and thus, the primary molded body S1 configured of the first molten resin P1 is formed in the cavity C1.

Subsequently, the secondary molded body is extracted from the cavity C2 by mold removing means (not shown). In addition, the reverse platen 9 rotates by 180° so as to be reversed, and as shown in FIG. 2, the reverse mold 6A holding the primary molded body S1 faces the movable mold 5 which is provided on the movable platen 3. Thereafter, the above-described series of molding cycle is sequentially repeated.

In the present embodiment, as described above, within the same period of the molding cycle based on the reversal of the reverse platen 9, the second molding step of performing the primary molding is performed in the cavity C1 on the fixed platen side mold part 1A side in parallel with the first molding step while the first molding step of performing the secondary molding is performed in the cavity C2 on the movable platen side mold part 1B side. In the first molding step and the second molding step, the operations are interlocked with each other as follows.

That is, as shown in FIG. 3, immediately before the injection and filling of the first molten resin (first material) P1 from the injection unit 11 start in the cavity (second cavity) C1 on the fixed platen side mold part (second mold part) 1A side, the mold clamping is performed by the mold clamping means 20 to compress the second molten resin (second material) P2 inside the cavity (first cavity) C2 on the movable platen side mold part (first mold part) 1B side.

In addition, after the compression of the second molten resin P2 inside the cavity C2 starts, the mold clamping force (compressive force) generated by the hydraulic cylinders 23 of the mold clamping means 20 is decreased at a predetermined timing. Here, the timing at which the mold clamping force is decreased by the hydraulic cylinders 23 can be determined by an elapsed time after the compression starts, a gap between the fixed mold 4 and the reverse mold 6B, the position of the reverse platen 9, or the like.

In addition, for example, in a case where the temperature of the fixed mold 4 or the reverse mold 6B is high and the solidification of the second molten resin P2 does not rapidly proceed, the mold clamping force may be decreased simultaneously with a close contact between the fixed mold 4 and the reverse mold 6B, or immediately after the close contact. That is, in the secondary molding (first molding step), in the end of the processing of compressing the second molten resin P2 inside the cavity C2, the mold clamping force may be decreased immediately before the movable mold 5 and the reverse mold 6B come into close contact with each other or in a state where a close-contact and pressing force does not sufficiently increase.

The decrease of the mold clamping force may be performed in stages or continuously. In addition, the staged increase of the mold clamping force and the continuous increase of the mold clamping force may be combined. In addition, the decease of the mold clamping force may be temporarily stopped during the decrease of the mold clamping force, or the mold clamping force temporarily increases, and thereafter, the mold clamping force may be decreased again.

In addition, in the end of the compression molding, a flow distance (a distance between the tip of the flowing resin and the end portion of the cavity C2) until the second molten resin P2 reaches the distal end of the cavity C2 is shortened already. Accordingly, since the cavity C2 can be filled with a resin having a slight compression amount, the mold clamping force (compressive force) required from flowing the second molten resin P2 may be small, and quality is not influenced even when the mold clamping force decreases.

In this way, after the mold clamping force generated by the hydraulic cylinders 23 of the mold clamping means 20 decreases, as shown in FIG. 4, the injection and filling of the first molten resin P1 from the injection unit 11 start in the cavity C1 on the fixed platen side mold part 1A side.

The timing when the injection of the first molten resin P1 starts may be the same as the timing when the decrease of the mold clamping force starts, or may be the timing when the mold clamping force decreases to a predetermined value. In addition, the timing for starting the injection may be performed when a predetermined time elapses from the starting timing in the decrease of the mold clamping force.

If the injection and filling of the first molten resin P1 starts, the reverse platen 9 is pressed to the movable platen 3 side via the reverse mold 6A by the pressure of the first molten resin P1 which fills the cavity C1. Accordingly, the second molten resin P2 inside the cavity C2 is pressed by the pressure of the first molten resin P1 via the reverse platen 9.

In addition, the first molten resin P1 fills the cavity C1, and thus, if the pressure inside the cavity C1 exceeds the mold clamping force, the reverse mold 6A is pressed toward the side separated from the fixed platen 2. Accordingly, the fixed mold 4 and the reverse mold 6A are slightly open. In addition, the slightly opening operation may be performed by not only the pressure increase inside the cavity C1 but also a combination between the pressure increase and the opening operation performed by the movable platen opening and closing means 14. In addition, the slightly opening operation may be performed by the opening operation performed by the movable platen opening and closing means 14 without using the pressure of the first molten resin P1 which fills the cavity C1.

Moreover, the compression in the primary molding is performed by increasing the mold clamping force generated by the hydraulic cylinders 23 of the mold clamping means 20.

According to the injection molding method and the injection molding machine for two-material molding 10 of the above-described embodiment, the pressure generated in the fixed platen side mold part 1A by injecting the first molten resin P1 into the cavity C1 acts on the movable platen side mold part 1B in the primary molding (second molding step), and the second molten resin P2 inside the cavity C2 is compressed in the secondary molding (first molding step). Accordingly, it is possible to increase the compressive force, which compresses the cavity C2, in the inner peripheral portion of the cavity C2. Specifically, since the pressure which is generated in the fixed platen side mold part 1A in which the cavity C1 is built presses the movable platen side mold part 1B via the reverse platen 9 at the center portion of the fixed platen side mold part 1A, it is possible to prevent a parting surface pressure on the inner peripheral portion of the cavity C2 from decreasing. Accordingly, the mold clamping force (compressive force) is not concentrated at the outer peripheral portion side of the cavity C2 on which the mold clamping means 20 is provided, and the thickness of the secondary molded body is easily uniformized.

Moreover, in the secondary molding (first molding step), in the end of the process of compressing the second molten resin P2 inside the cavity C2, immediately before the movable mold 5 and the reverse mold 6B come into close contact with each other, or before the close-contact and pressing force sufficiently increases the compressed amounts of the corner portions are excessive, the mold clamping force decreases. Accordingly, it is possible to prevent deformation of the movable platen 3. In addition, in this case, since the second molten resin P2 inside the cavity C2 in the secondary molding is pressed by the pressure of the first molten resin P1 in the primary molding, even when the mold clamping force generated by the mold clamping means 20 decreases, it is possible to prevent occurrence of the gap in the intermediate portion positioned between the corner portions adjacent to each other in the direction along the periphery of the cavity C2.

Accordingly, in the injection and compression method of the related art, in the mold clamping device which applies the mold clamping force to the platen from the outer peripheral side, the following two contents conflicting to each other cannot be realized. However, in the present invention, the two contents can be realized. That is, in the present invention, gas extraction being improved without excessively increasing the compression amounts at the corner portions by decreasing the parting surface pressure at the corner portions in the cavity C2 in the secondary molding, and preventing occurrence of burrs in the obtained secondary molded body by preventing a decrease in the partial contact pressure of the intermediate portion positioned between corner portions on the matching surface between the fixed mold 4 and the reverse mold 6B can be realized.

In addition, the pressure of the first molten resin P1 inside the cavity C1 in the primary molding presses the reverse platen 9 toward the movable platen 3 side via the reverse mold 6A. Accordingly, pressure holding in the cavity C2 in the secondary molding can be obtained, that is, it is possible to resist the force by which the movable platen side mold part 1B is opened. Accordingly, it is possible to prevent unintentional mold opening by a simple configuration.

Moreover, a lock mechanism such as a clamper which restricts unintentional mold opening may be provided in the movable platen side mold part 1B. In this case, according to the present invention, it is possible to decrease a load subjected to the lock mechanism which resists the unintentional mold opening, and for example, it is possible to prevent lifetime of the lock mechanism from decreasing.

As described above, it is possible to perform molding with excellent quality while preventing an increase in a size, an increase in weight, and an increase in a cost of the apparatus.

In addition, the above-described injection molding method can be realized by only replacing a computer program which controls the operation of the existed two-material injection molding machine 10.

Second Embodiment

Next, a second embodiment of the injection molding method and the injection molding machine according to the present invention will be described.

In the configuration of the injection molding machine for two-material molding 10, the second embodiment described below is similar to the above-described first embodiment, and only the operation timings are different from each other. In the second embodiment, the timing of the primary molding and the timing of the secondary molding in the first embodiment are replaced. Hereinafter, the differences will mainly be described.

Figure 6:
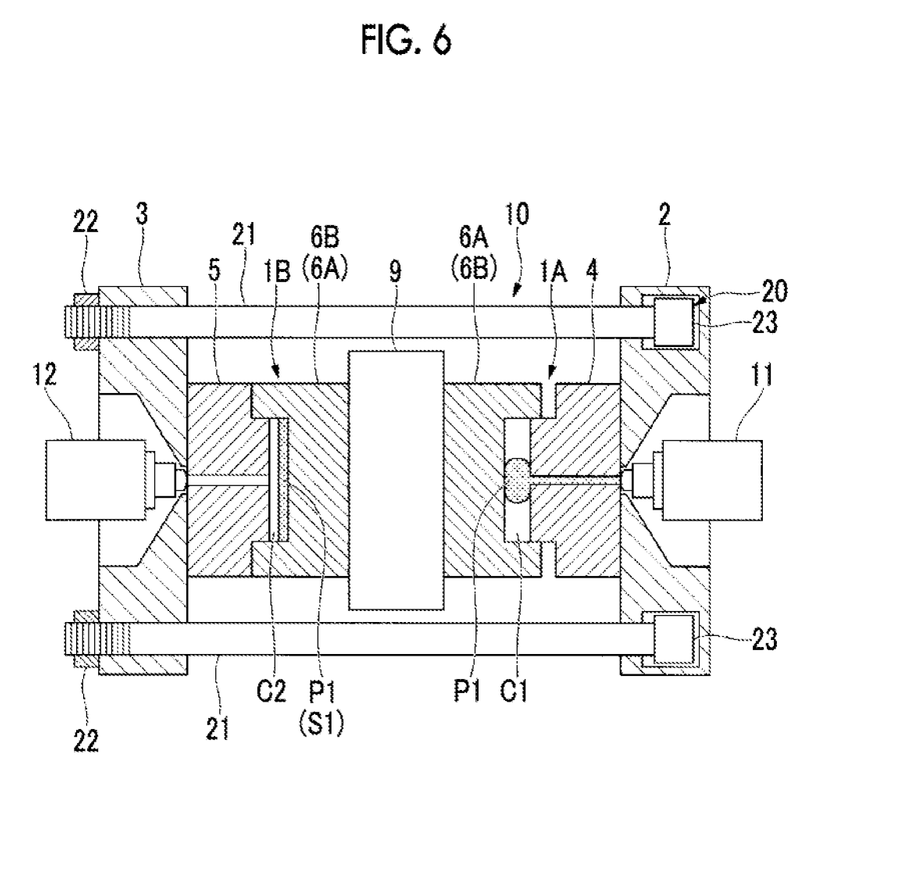
FIG. 6 is a view showing a flow of an injection molding method in an injection molding machine in a second embodiment of the present invention, and a horizontal sectional view showing a state where a material is injected into a first cavity in a first molding step.
Figure 7:
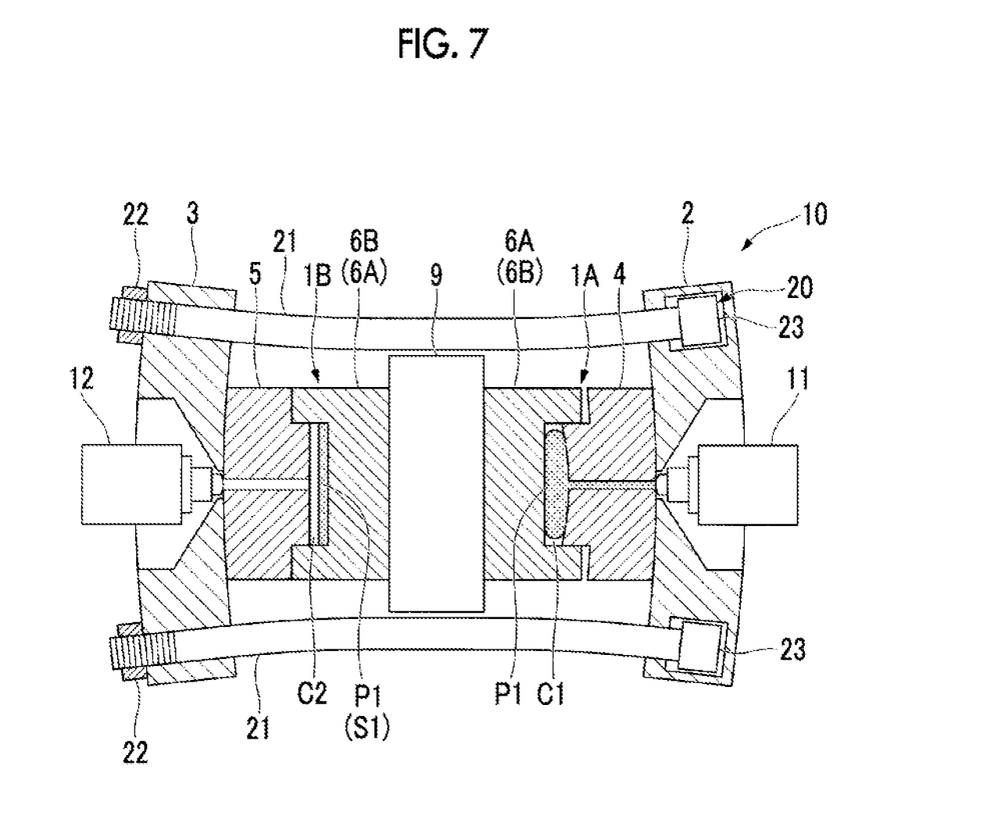
FIG. 7 is a view showing the flow of the injection molding method in the injection molding machine in the second embodiment of the present invention, and a horizontal sectional view showing a state where the material which fills the first cavity in the first molding step is compressed.
Figure 8:
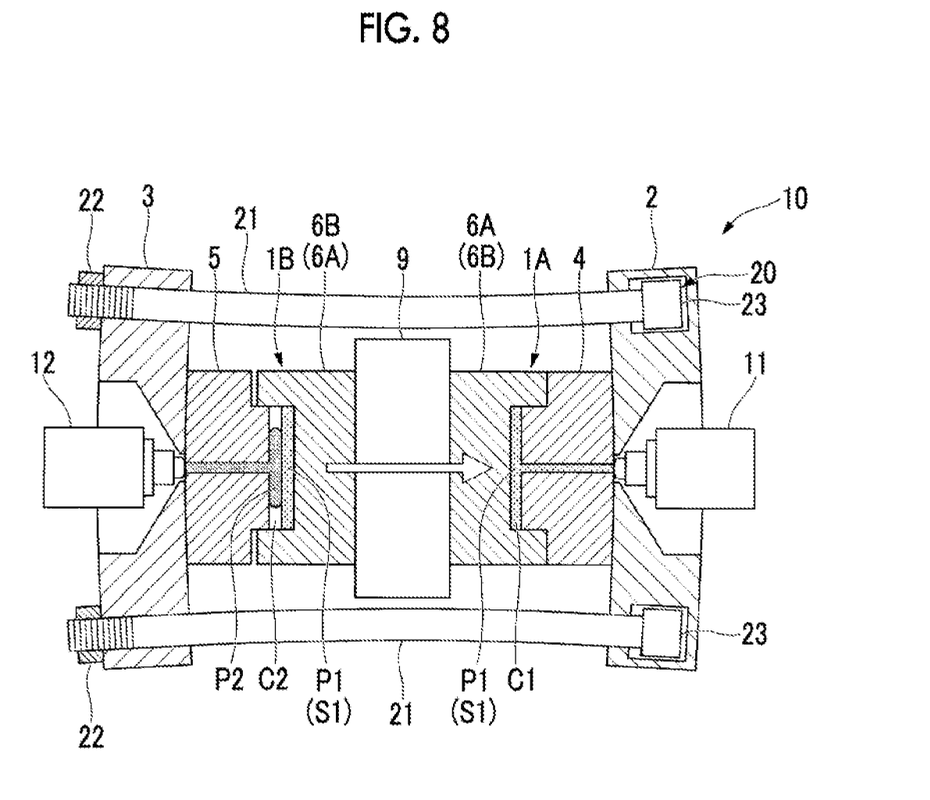
FIG. 8 is a view showing the flow of the injection molding method in the injection molding machine in the second embodiment of the present invention, and a horizontal sectional view showing a state where a material fills a second cavity in a second molding step.
Figure 9:
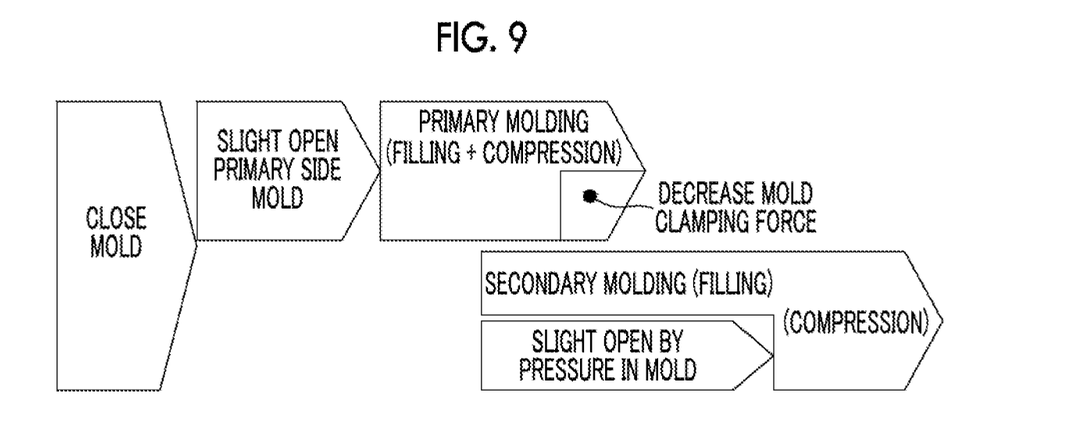
FIG. 9 is a diagram showing the flow of the injection molding method in the second embodiment of the present invention.

FIG. 6 is a view showing a flow of an injection molding method in an injection molding machine in the second embodiment of the present invention, and a horizontal sectional view showing a state where a material is injected into a first cavity in a first molding step. FIG. 7 is a view showing the flow of the injection molding method in the injection molding machine in the second embodiment of the present invention, and a horizontal sectional view showing a state where the material which fills the first cavity in the first molding step is compressed. FIG. 8 is a view showing the flow of the injection molding method in the injection molding machine in the second embodiment of the present invention, and a horizontal sectional view showing a state where a material fills a second cavity in a second molding step. FIG. 9 is a diagram showing the flow of the injection molding method in the second embodiment of the present invention.

Similarly to the first embodiment, in this embodiment, as shown in FIGS. 6 to 8, the first molding step of performing the primary molding is performed in the cavity C1 on the fixed platen side mold part 1A side which is formed between the fixed mold 4 on the fixed platen 2 side and the reverse mold 6B in parallel with the second molding step while the second molding step of performing the secondary molding is performed in the cavity C2 on the movable platen side mold part 1B side. In the first molding step and the second molding step, the operations are interlocked with each other as follows.

That is, as shown in FIG. 6, after the first molten resin P1 fills the cavity (first cavity) C1 on the fixed platen side mold part (first mold part) 1A side in the primary molding (first molding step), as shown in FIG. 8, the injection and filling of the second molten resin P2 from the injection unit 12 with respect to the cavity (second cavity) C2 on the movable platen side mold part (second mold part) 1B side is performed in the secondary molding (second molding step). In addition, as shown in FIG. 7, immediately before the injection and filling of the second molten resin P2 start, mold clamping is performed by the mold clamping means 20 to compress the first molten resin P1 inside the cavity C1.

In addition, in the cavity C1 on the fixed platen side mold part 1A side, the mold clamping force (compressive force) generated by the hydraulic cylinders 23 of the mold clamping means 20 is decreased at a predetermined timing. As shown in FIGS. 8 and 9, in the cavity C2 on the movable platen side mold part 1B side, the injection and filling of the second molten resin P2 from the injection unit 12 start.

If the injection and filling of the second molten resin P2 start, the reverse platen 9 is pressed to the fixed platen 2 side via the reverse mold 6A by the pressure of the second molten resin P2 which fills the cavity C2. Accordingly, the first molten resin P1 inside the cavity C1 is pressed by the pressure of the second molten resin P2 via the reverse platen 9.

Third Embodiment

Next, a third embodiment of the injection molding method and the injection molding machine according to the present invention will be described.

In the configuration of the injection molding machine for two-material molding 10, the third embodiment described below is similar to the above-described first embodiment, and only the operation timings are different from each other. Hereinafter, the differences will mainly be described.

In the third embodiment, simultaneously with the end of the compression operation of the second molten resin P2 inside the cavity C2, or immediately after the compression operation ends, in a state where the movable mold 5 and the reverse mold 6A or 6B come into close contact with each other, the mold clamping force generated by the hydraulic cylinders 23 of the mold clamping means 20 decreases, and the injection of the first molten resin P1 starts.

Accordingly, when the injection of the second molten resin P2 starts, the movable mold 5 and the reverse mold 6A or 6B come into close contact with each other, and the shape inside the cavity C2 is the same as the shape of the final product of the secondary molded body. In this state, since the reverse platen 9 can be pressed to the movable platen 3 side via the reverse mold 6A by the pressure of the first molten resin P1 in the cavity C1 in the primary molding, it is possible to form the secondary molded body with high accuracy. As a result, dimension accuracy of the secondary molded body increases, and in a case where the secondary molded body has light transmission, it is possible to prevent optical distortion thereof.

Moreover, the present invention is not limited to the above-described embodiments, and design modifications may be applied within a scope which does not depart from the gist of the present invention.

For example, in each of the above-described embodiments, the primary molding is performed on the fixed platen side mold part 1A side, and the secondary molding is performed on the movable platen side mold part 1B side. However, the present invention is not limited to this. The configuration of the present invention can be applied to a case where two-material molding is not performed, and the primary molding in the fixed platen side mold part 1A and the primary molding in the movable platen side mold part 1B are performed in parallel with each other.

In each of the above-described embodiments, the primary molding and the secondary molding are compression molding. However, the present invention is not limited to this. For example, in the first embodiment, the primary molding may not be compression molding, and in the second embodiment, the secondary molding may not be compression molding.

In addition, in each of the above-described embodiments, the mold clamping device is the two-plate type mold clamping device. However, the molding clamping device of the present invention may be a mold clamping device in which the mold clamping force is applied to the outer peripheral side of the platen, for example, may be a three-plate type mold clamping device or a toggle type mold clamping device.

INDUSTRIAL APPLICABILITY

Since the material inside the first cavity is compressed by the pressure generated by injecting the material into the second cavity, it is possible to perform molding with excellent quality while preventing an increase in a size, an increase in weight, and an increase in a cost of the apparatus.

REFERENCE SIGNS LIST

1A: fixed platen side mold part (second mold part, first mold part)
1B: movable platen side mold part (first mold part, second mold part)
2: fixed platen
3: movable platen
4: fixed mold
5: movable mold
6A, 6B: reverse mold
9: reverse platen
9a, 9b: side surface
10: injection molding machine for two-material molding (injection molding machine)
11: injection unit
12: injection unit
14: movable platen opening and closing means
14a: ball screw shaft
14b: ball screw nut
14c: servo motor
15: reverse platen opening and closing means
15a: ball screw shaft
15b: ball screw nut
20: mold clamping means
21: tie bar
22: tie bar fixing means
23: hydraulic cylinder
50: controller
C1: cavity (second cavity, first cavity)
C2: cavity (first cavity, second cavity)
P1: first molten resin (first material)
P2: second molten resin (second material)
S1: primary molded body
S2: secondary molded body

The invention claimed is:

1. An injection molding method which uses an injection molding machine including a first mold part which is provided with a first cavity, and a second mold part which is provided with a second cavity and is arranged in tandem with the first mold part, the method comprising:

a first molding step of injecting a second material into the first cavity and compressing the second material in the first cavity; and a second molding step of injecting a first material into the second cavity, wherein in the first molding step and the second molding step, the first mold part and the second mold part are clamped together by mold clamping means, wherein in the second molding step, while a pressure generated in the second mold part by injecting the material into the second cavity in the second molding step acts on the first mold part so that a compressive force is applied to the second material in the first cavity, a mold clamping force generated by the mold clamping means is decreased at a predetermined timing, wherein a molding cycle is defined by including the first molding step and the second molding step, wherein the second material is laminated on a primary molded body formed of the first material to form a secondary molded body formed of the first material and the second material, wherein in the first molding step, the second material is injected in a state where the primary molded body is accommodated in the first cavity to form the secondary molded body, the primary molded body being formed during the second molding step in an earlier molding cycle than a current molding cycle, and in the second molding step, the first material is injected into the second cavity to form a different primary molded body used in the first molding step in a later molding cycle.

2. The injection molding method according to claim 1, wherein in the second molding step, the second mold part is opened by a pressure of the first material injected into the second cavity, and then the second mold part is closed and a compressive force is applied to the first material in the second cavity.

3. The injection molding method according to claim 1, wherein in the second molding step, after a pressure generated in the second mold part by injecting the first material into the second cavity in the second molding step acts on the first mold part and a compressive force is applied to the second material in the first cavity, a processing of controlling the mold clamping means to decrease a mold clamping force provided by the mold clamping means at a predetermined timing is performed.

4. The injection molding method according to claim 1, wherein in the second molding step, after a pressure generated in the second mold part by injecting the first material into the second cavity in the second molding step acts on the first mold part and a compressive force is applied to the second material in the first cavity, the mold clamping force generated by the mold clamping means is decreased at a timing when a volume of space formed in the first cavity or the second cavity is minimum or immediately after the timing.

* * * * *